(12) United States Patent
Agin

(10) Patent No.: US 7,099,637 B2
(45) Date of Patent: Aug. 29, 2006

(54) METHOD OF EVALUATING THE QUALITY OF A RADIO LINK IN A MOBILE RADIOCOMMUNICATION SYSTEM

(75) Inventor: Pascal Agin, Sucy en Brie (FR)

(73) Assignee: Alcatel, Paris (FR)

( * ) Notice: Subject to any disclaimer, the term of this patent is extended or adjusted under 35 U.S.C. 154(b) by 657 days.

(21) Appl. No.: 09/919,800

(22) Filed: Aug. 2, 2001

(65) Prior Publication Data

US 2002/0042254 A1    Apr. 11, 2002

(30) Foreign Application Priority Data

Aug. 11, 2000 (FR) .................................. 00 10590

(51) Int. Cl.
*H04M 15/00* (2006.01)
*H04M 1/64* (2006.01)

(52) U.S. Cl. .................................... 455/135; 455/67.13
(58) Field of Classification Search ............ 455/67.13, 455/135, 161.3, 277.2, 522
See application file for complete search history.

(56) References Cited

U.S. PATENT DOCUMENTS

| 5,828,672 | A | | 10/1998 | Labonte et al. | |
| 5,987,319 | A | * | 11/1999 | Hermansson et al. | 455/422.1 |
| 6,212,386 | B1 | * | 4/2001 | Briere et al. | 455/447 |
| 6,259,927 | B1 | * | 7/2001 | Butovitsch et al. | 455/522 |
| 6,308,065 | B1 | * | 10/2001 | Molinari et al. | 455/424 |
| 6,347,217 | B1 | * | 2/2002 | Bengtsson et al. | 455/67.7 |
| 6,405,020 | B1 | * | 6/2002 | Oestreich et al. | 455/67.13 |
| 6,549,785 | B1 | * | 4/2003 | Agin | 455/522 |
| 6,564,067 | B1 | * | 5/2003 | Agin | 455/522 |
| 6,697,776 | B1 | * | 2/2004 | Fayad et al. | 704/233 |
| 6,728,233 | B1 | * | 4/2004 | Park et al. | 370/342 |
| 6,859,501 | B1 | * | 2/2005 | Zimmermann et al. | 375/260 |

FOREIGN PATENT DOCUMENTS

| GB | 2 330 737 A | 4/1999 |
| WO | WO 99/12304 | 3/1999 |

* cited by examiner

*Primary Examiner*—Bing Q. Bui
(74) *Attorney, Agent, or Firm*—Sughrue Mion, PLLC

(57) ABSTRACT

A method of evaluating the quality of a radio link in a mobile radiocommunication system from the net bit rate transmitted on the link.

16 Claims, 1 Drawing Sheet

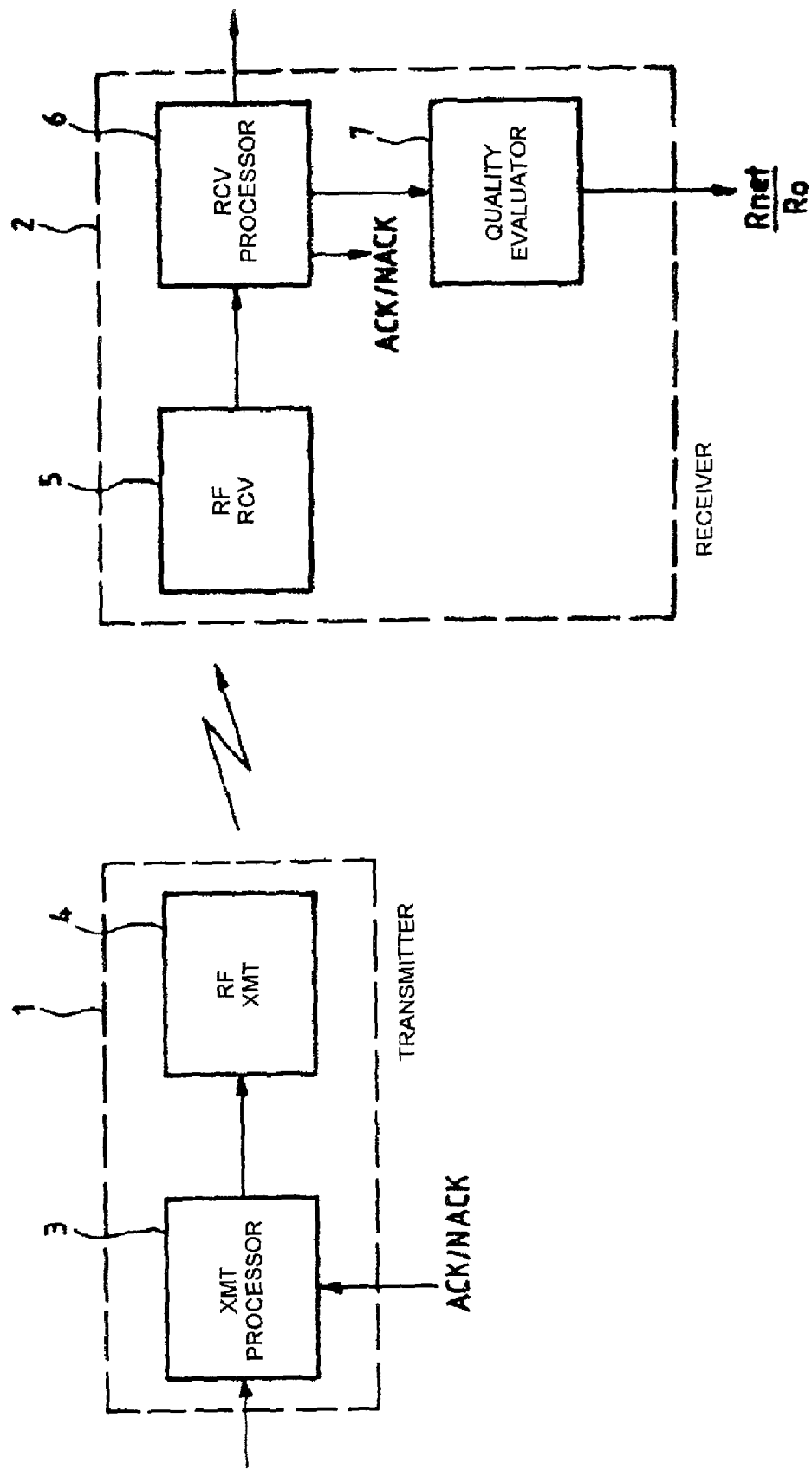

METHOD OF EVALUATING THE QUALITY OF A RADIO LINK IN A MOBILE RADIOCOMMUNICATION SYSTEM

CROSS-REFERENCE TO RELATED APPLICATIONS

This application is based on French Patent Application No. 00 10 590 filed Aug. 11, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates generally to mobile radiocommunication systems.

2. Description of the Prior Art

In mobile radiocommunication systems, various processing operations are necessary to format information to be transmitted in a form suitable for its transmission to the radio interface.

In particular, coding (such as error correcting coding in particular) intended to introduce redundancy into the information transmitted provides protection against transmission errors. The coding rate is defined as the ratio of the number of information bits to be transmitted to the number of bits transmitted or bits coded. The coding is generally effected on sequences of information bits or blocks. For given allocated radio resources, the higher the coding rate the higher the information bit rate. However, a high coding rate necessitates good radio conditions, and otherwise quality of service is degraded.

Additional protection against transmission errors is generally provided for data services, generally by retransmitting blocks received incorrectly using a technique known as ARQ (Automatic Repeat reQuest). The blocks received incorrectly can be blocks in which errors are detected by an error detecting code or can be corrected by an error correcting code. The receiver signals the correct or incorrect status of the blocks received to the transmitter by means of acknowledgement messages (ACK) or non-acknowledgement messages (NACK).

Another processing operation is modulation to obtain an analog signal conveying information to be transmitted. Various modulation techniques are known in the art, characterized by their spectral efficiency, i.e. their ability to transmit a larger or smaller number of bits per symbol for the same allocated frequency band. In the GPRS (General Packet Radio Service) system, for example, there is only one form of modulation, GMSK, which transmits one bit per symbol, and in the EGPRS (Enhanced General Packet Radio Service) system there are two types of modulation, GMSK, which transmits one bit per symbol, and 8PSK, which transmits three bits per symbol. The higher the spectral efficiency of the modulation, the higher the bit rate of bits transmitted. However, a high spectral efficiency necessitates good radio conditions and quality of service is otherwise degraded.

Various techniques can be used to optimize the performance of the above systems, such as the following techniques in particular:

link adaptation: this technique dynamically adapts the coding and/or modulation scheme used as a function of radio conditions; in particular, when radio conditions are good, the coding rate can be increased and/or a type of modulation with higher spectral efficiency can be used, to increase the bit rate; for example, as defined in the document "GSM 03.64 Version 8.2.0 Release 1999" published by the ETSI, there are four possible coding schemes (CS1 TO CS4) in the GPRS system and nine possible modulation and coding schemes (MCS1 to MCS9) in the EGPRS system;

cell reselection; because the above systems generally have a cellular architecture, this technique selects a best cell to which to hand over a call in progress in accordance with radio criteria and possibly in accordance with other criteria; etc.

It is therefore very important in the above systems to be able to evaluate the radio conditions as accurately as possible; otherwise performance can be degraded.

The quality of a radio link is generally represented by one or more quality indicators, such as the raw bit error rate (BER), the block erasure rate (BLER), the signal-to-interference ratio (SIR), etc.

The raw BER is obtained by comparing data received before error correcting decoding with corresponding data obtained after error correcting decoding followed by recoding using the same error correcting code as the transmitter.

The BLER corresponds to the rate of data blocks received incorrectly. If the retransmission technique is used, unlike other quality indicators, the BLER can also be determined at the transmitter, from the ACK/NACK messages transmitted by the receiver. Algorithms such as link adaptation or cell reselection algorithms, for example, are generally used in the network, so that the network can itself determine the BLER for the downlink direction without it being necessary for the mobile station to report to the network the BLER value that it determines.

A drawback of quality indicators like the raw BER or the SIR is that, unlike the BLER, they require an estimate, whence a risk of errors and therefore of degrading system performance.

Another drawback of quality indicators such as the raw BER or the SIR is that they are not directly representative of performance. These quality indicators are in fact representative of the quality of the transmission channel, and the relation between the quality of service and the quality of the transmission channel is not fixed, but depends on many factors such as the environment, the speed of the mobile station, etc. From this point of view, the BLER criterion is more pertinent or more representative of performance.

However, the BLER is not the most pertinent criterion in all cases.

In systems in which several coding and/or modulation schemes are possible, for example, such as the GPRS and EGPRS systems, for instance, unlike other quality indicators such as the raw BER or the SIR, the BLER depends on the coding and/or modulation scheme used.

Accordingly, for the GPRS system, the document WO 99/12304 proposes to estimate the value of the BLER that would be obtained for each coding scheme from statistical calculations on quality indicators obtained, such as the raw BER or the SIR, combined with the results of preceding trial and error or simulations. The document therefore does not propose to use quality indicators other than the raw BER or the SIR, and proposes a complex technique for estimating the BLER from the quality indicators obtained in this way, such as the raw BER or the SIR.

Similarly, if the technique of retransmitting blocks received incorrectly is used, the BLER is not the most pertinent criterion either.

There are other cases in which the BLER does not constitute a satisfactory criterion, in particular if the incremental redundancy technique is used. This technique is a more sophisticated and more effective retransmission technique than that previously mentioned. Instead of retransmitting a block always with the same coding scheme, it retransmits the block with a different coding scheme each time, and uses all successive retransmissions of the block conjointly to reduce the probability of decoding it incorrectly. All the blocks can then be transmitted without protection on their first transmission. For example, the effective coding rate is 1 after the first transmission, ½ after the first retransmission, ⅓ after the second retransmission, and so on. This technique, like the link adaptation technique, can therefore increase the usable bit rate, but as the BLER can then be much higher than in the case where this technique is not used, this criterion is not the most pertinent one either.

The document GB 2 330 737 proposes a quality indicator obtained by determining the difference between the number of packets received correctly or the number of packets whose transmission is required and the number of packets actually transmitted. However, this is not the most pertinent criterion either, especially if techniques such as the link adaptation or incremental redundancy techniques previously referred to are used.

There is therefore a need for a quality indicator that would in particular circumvent the various drawbacks previously cited and that would in particular be pertinent for most systems, although accurate and relatively simple to calculate.

SUMMARY OF THE INVENTION

The present invention therefore provides a method of evaluating the quality of a radio link in a mobile radiocommunication system from the net bit rate transmitted on the link.

According to another feature of the invention data transmitted on the link is obtained by coding blocks of information bits and the net bit rate is obtained by calculation using the equation:

$$R_{net} = \frac{1}{T} \sum_{i=0}^{NB\_RECEIVED-1} N_i$$

in which NB_RECEIVED is the number of blocks received correctly during a given period T and $N_i$ is the number of information bits in the i-th block received correctly.

According to another feature of the invention quality is evaluated on the basis of the relative net bit rate, which is defined as the ratio between the net bit rate and the gross bit rate.

According to another feature of the invention the ratio between the net bit rate and the gross bit rate is obtained by calculation using the equation:

$$\frac{R_{net}}{R_0} = \frac{\sum_{i=0}^{NB\_RECEIVED-1} N_i}{\sum_{i=0}^{NB\_SENT-1} N_i^{(c)}}$$

in which NB_SENT is the number of blocks transmitted during a given period, NB_RECEIVED is the number of corresponding blocks received correctly, $N_i^{(c)}$ is the number of bits of the i-th block transmitted, and $N_i$ is the number of information bits in the i-th block received correctly.

According to another feature of the invention the number of bits of the blocks transmitted is a function of the modulation scheme used and the gross bit rate is determined for a given modulation scheme corresponding to a reference modulation regardless of the modulation scheme used.

According to another feature of the invention the ratio between the net bit rate and the gross bit rate is obtained by calculation using the equation:

$$\frac{R_{net}}{R_0} = \frac{\sum_{i=0}^{NB\_RECEIVED-1} N_i}{NB\_SENT * N^{(c)}}$$

in which NB_SENT is the number of blocks transmitted during a given period, NB_RECEIVED is the number of corresponding blocks received correctly, $N^{(c)}$ is the number of bits in a block transmitted with a given modulation scheme corresponding to a reference modulation, and $N_i$ is the number of information bits in the i-th block received correctly.

According to another feature of the invention the reference modulation is a modulation of lower spectral efficiency.

According to another feature of the invention the blocks transmitted, or radio blocks, can include one or more blocks, or data blocks, depending on the modulation scheme used, and the ratio between the net bit rate and the gross bit rate is obtained by calculation using the equation:

$$\frac{R_{net}}{R_0} = \frac{\sum_{i=0}^{NB\_RECEIVED-1} \frac{N_i}{n_i}}{\sum_{i=0}^{NB\_SENT-1} \frac{N_i^{(c)}}{n_i'}}$$

in which NB_SENT is the number of data blocks transmitted during a given period, NB_RECEIVED is the number of corresponding data blocks received correctly, $N_i^{(c)}$ is the number of bits in the radio block including the i-th block of data transmitted, $N_i$ is the number of information bits in the radio block including the i-th block of data received, and ni (respectively n'i) is equal to the number of data blocks in the radio block containing the i-th block of data received (respectively transmitted).

According to another feature of the invention the blocks transmitted, or radio blocks, can include one or more blocks, or data blocks, depending on the modulation scheme used, and the ratio between the net bit rate and the gross bit rate is obtained by calculation using the equation:

$$\frac{R_{net}}{R_0} = \frac{\sum_{i=0}^{NB\_RECEIVED-1} \frac{N_i}{n_i}}{\sum_{i=0}^{NB\_SENT-1} \frac{N^{(c)}}{n_i'}}$$

in which NB_SENT is the number of data blocks transmitted during a given period, NB_RECEIVED is the number of corresponding data blocks received correctly, $N^{(c)}$ is the number of bits in a radio block for a given modulation scheme corresponding to a reference modulation, $N_i$ is the number of information bits in the radio block including the i-th data block received, and ni (respectively n'i) is equal to the number of data blocks in the radio block containing the i-th data block received (respectively transmitted).

According to another feature of the invention the ratio between the net bit rate and the gross bit rate is obtained by calculation using the equation:

$$\frac{R_{net}}{R_0} = \frac{\sum_{i=0}^{NB\_RECEIVED-1} \frac{\rho_i}{n_i}}{\sum_{i=0}^{NB\_SENT-1} \frac{1}{n'_i}}$$

in which $\rho_i$ is equal to $N_i/N^{(c)}$.

The invention also provides a mobile radiocommunication system adapted to evaluate the quality of a radio link from the net bit rate transmitted on the link.

According to another feature of the invention the link is an uplink.

According to another feature of the invention the link is a downlink.

The invention also provides a mobile radiocommunication network entity adapted to evaluate the quality of a radio link from the net bit rate transmitted on the link.

According to another feature of the invention the link is an uplink.

According to another feature of the invention the link is a downlink.

The invention also provides a mobile station adapted to evaluate the quality of a radio link from the net bit rate transmitted on the link.

According to another feature of the invention the link is a downlink.

According to another feature of the invention the link is an uplink.

BRIEF DESCRIPTION OF THE DRAWING

Other objects and features of the present invention will become apparent on reading the following description of embodiments of the invention, which is given with reference to the accompanying drawing, which is a diagram showing a radio link whose quality is evaluated by a method according to the invention.

DETAILED DESCRIPTION OF THE PREFERRED EMBODIMENT

The present invention therefore proposes to use a criterion tied to the net bit rate.

The gross bit rate $R_{gross}$ is defined as the bit rate of bits transmitted to the radio interface. The net bit rate $R_{net}$ is the bit rate obtained after deducting from the gross bit rate everything that is not useful to the user, such as the redundancy introduced by the coding or blocks received incorrectly.

The net bit rate can be expressed in the following manner:
$R_{net} = \rho R_{gross}(1-BLER)$, where $\rho$ denotes the coding rate (assumed to be fixed in this expression) and BLER denotes the rate at which blocks are received incorrectly (or retransmitted).

To obtain a more general expression that is valid even with a variable coding rate, one possible expression of a quality indicator according to the invention is as follows:

$$R_{net} = \frac{1}{T} \sum_{i=0}^{NB\_RECEIVED-1} N_i$$

in which NB_RECEIVED is the number of blocks received correctly during a period T and $N_i$ is the number of information blocks in the i-th block received correctly. The number $N_i$ depends on the coding and/or modulation scheme applied in the i-th block received. The higher the coding rate and/or the higher the spectral efficiency of the modulation, the higher this number. $R_{net}$ can take any positive value.

The net bit rate $R_{net}$ may not be the most appropriate criterion, however, because $R_{net}$ depends not only on radio conditions but also on the radio resources allocated (for given radio conditions, the greater the radio resources allocated, the higher $R_{net}$). Consequently, to have a better quality indicator, it may be preferable to consider the relative net bit rate, i.e. the ratio of the net bit rate to the gross bit rate. In this case, for given radio conditions, the ratio will keep the same value regardless of the quantity of radio resources allocated.

A second possible expression for a quality indicator according to the present invention is then as follows:

$$\frac{R_{net}}{R_0} = \frac{\sum_{i=0}^{NB\_RECEIVED-1} N_i}{\sum_{i=0}^{NB\_SENT-1} N_i^{(c)}}$$

in which NB_SENT is the number of blocks transmitted by the transmitter during a given period, NB_RECEIVED is the number of corresponding blocks received correctly, $N_i^{(c)}$ is the number of bits of the i-th block transmitted, and $N_i$ is the number of information bits of the i-th block received correctly.

The number $N_i^{(c)}$ depends on the modulation scheme applied in the i-th block transmitted. The higher the spectral efficiency, the higher this number. The blocks received taken into consideration to calculate the numerator must correspond to the blocks transmitted counted in the denominator, and NB_RECEIVED is therefore less than or equal to NB_SENT. $R_{net}/R_0$ is from 0 to 1. The higher this number, the better the radio conditions (and therefore performance).

In systems including a plurality of possible modulation schemes, another possibility is to consider a given modulation scheme corresponding to a given reference modulation for the raw bit rate, i.e. to replace $N_i^{(c)}$ with $N^{(c)}$, which is the number of bits of a block using the reference modulation (for example GMSK in the EGPRS system). In this case, the ratio $R_{net}/R_0$ can be obtained from the following equation:

$$\frac{R_{net}}{R_0} = \frac{\sum_{i=0}^{NB\_RECEIVED-1} N_i}{NB\_SENT * N^{(c)}}$$

in which NB_SENT is the number of blocks transmitted during a given period, NB_RECEIVED is the number of corresponding blocks received correctly, $N^{(c)}$ is the number of bits of a block transmitted with a given modulation scheme corresponding to a reference modulation, and $N_i$ is the number of information bits of the i-th block received correctly.

Choosing as reference modulation a type of modulation of lower spectral efficiency (i.e. for which the number of bits per symbol transmitted is the lowest), such as GMSK in the EGPRS system, the latter expression has an additional advantage, which is that it takes into account the fact that the performance is better when a block is received correctly using modulation of high spectral efficiency than if a block is received correctly using modulation of low spectral efficiency. For example, in the EGPRS system, there are two possible types of modulation: GMSK (one bit per symbol) and 8PSK (three bits per symbol). 8PSK provides about three times the bit rate of GMSK (but requires a higher transmission power and better radio conditions) and therefore enjoys a higher spectral efficiency (higher bit rate for a given band of frequency). In this case, for a given value of BLER, $R_{net}/R_0$ will be larger using 8PSK than using GMSK (about three times larger) instead of being unchanged with the expression given previously. Consequently, the new expression will be more appropriate when a plurality of modulation schemes are possible (which is the case for the EGPRS system, for example). Note that with this new expression the ratio $R_{net}/R_0$ can be greater than 1, because $N_i$ can then be greater than $N^{(c)}$.

The FIGURE shows diagrammatically a radio link between a transmitter 1 and a receiver 2 in a mobile radiocommunication system. The transmitter can be in a mobile station, for example, and the receiver 2 in the network. The link is then an uplink. Conversely, the transmitter 1 can be in the network and the receiver 2 in a mobile station. The link is then a downlink.

In the example shown, the transmitter 1 includes:

a transmit processor 3, having functions such as coding, modulation, retransmitting blocks received incorrectly (under the control of ACK/NACK messages received from the receiver 2), etc, and a radio-frequency transmitter 4.

In the example shown, the receiver 2 includes:

a radio-frequency receiver 5, and a receive processor 6, implementing functions such as decoding, demodulation, detecting the correct or incorrect status of blocks received, transmitting the transmitter 1 corresponding acknowledgement or non-acknowledgement (ACK/NACK) messages, etc.

The figure also shows a link quality evaluator 7. In the example shown, the evaluator 7 is in the receiver, but in a different example it could be in the transmitter. The evaluator 7 calculates a quality indicator in accordance with the invention, for example the ratio $R_{net}/R_0$, using one or the other of the possible expressions, and to this end receives the parameters necessary for the calculation. For example, the numbers NB_RECEIVED and Ni are supplied by the receive processor 6 and the other parameters (such as T, NB_SENT, $N^{(c)}$ previously defined) can have predetermined values.

An example of application of the present invention is described below, corresponding more particularly, by way of example, to the GPRS and EGPRS systems. For a description of those systems, see for example the document "GSM 03.64 Version 8.2.0. Release 1999" published by the ETSI.

In the above systems, when information must be transmitted from or to a mobile station, that mobile station is allocated resources in the form of an uplink or downlink TBF (Temporary Block Flow) and one or more PDCH (Physical Data Channels). A PDCH is a physical channel corresponding to one time slot per frame (a frame includes eight time slots) and to one frequency or to one set of frequencies if the frequency hopping technique is used. Several TBF can be distributed over the same physical data channels, which means that the same physical channel can be shared between several mobile stations, which optimizes the use of radio resources in the case of packet mode data transmission.

The radio criterion proposed in accordance with the invention is then calculated for each TBF separately.

What is more, in accordance with the layered architecture of the above systems, the RLC (Radio Link Control) layer being responsible for the retransmission procedure to the radio interface, the radio criterion proposed in accordance with the invention is then calculated in this layer. The blocks mentioned above then correspond to blocks referred to as RLC data blocks, i.e. RLC blocks conveying data (RLC blocks can also be used to convey signaling or control information).

In the GPRS system, an RLC data block is transmitted every 20 ms (on average) to the radio interface, in four consecutive time slots. In the EGPRS system, one or two RLC data blocks are transmitted every 20 ms (one RLC data block for the modulation and coding schemes MCS1 to MCS6 and two RLC data blocks for the modulation and coding schemes MCS7 to MCS9).

During this period, the number $N^{(c)}$ of bits defined previously is equal to 456 in the GPRS system and to 464 in the EGPRS system (for the situation in which the reference modulation is GMSK). The sequence of bits transmitted in 20 ms to the radio interface is called a radio block. A radio block therefore contains one or two RLC data blocks as well as additional control information. A radio block is obtained at the output of the RLC/MAC (Radio Link Control/Media Access Control) layer and is applied as input to the physical layer. Accordingly, at the radio interface, control information from the physical layer is additionally sent (such as a training sequence, control information known as stealing flags, etc).

In the GPRS system, a radio block is made up of an RLC data block and control information called the MAC header, the RLC header and the block check sequence (BCS). In the EGPRS system, a radio block is made up of one or two RLC data blocks and control information called the MAC header, the RLC header, and the header check sequence (HCS). The block check sequence (BCS) consists of control bits obtained by applying a CRC (cyclic redundancy check) error detecting code to each RLC data block. The error detecting code detects if an RLC data block is received correctly or not. In the application to the GPRS and EGPRS systems, the blocks considered in accordance with the invention are therefore the RLC data blocks, i.e. all of the bits to which the CRC applies.

Note that the values given above for the number $N^{(c)}$ do not correspond exactly to the number of bits (or coded bits) considered previously, i.e. include not only the data but also control information such as the MAC header, the RLC header, etc. However, note that the bit rate $R_o$ is merely a reference bit rate and can therefore be calculated differently (for example excluding the control information MAC header and RLC header, etc), but in this case it could vary as a function of the block, which would render the expression more complex.

The number of information bits that can be transmitted in an RLC data block depends on the coding scheme used and also on the modulation used in the case of the EGPRS system.

To take into account the fact that one or two RLC data blocks can be transmitted in one radio block, the radio criterion previously given can be slightly modified, as follows:

$$\frac{R_{net}}{R_0} = \frac{\sum_{i=0}^{NB\_RECEIVED-1} \frac{N_i}{n_i}}{\sum_{i=0}^{NB\_SENT-1} \frac{N^{(c)}}{n'_i}}$$

in which NB_SENT is the number of the RLC data blocks (also referred to for simplicity here as data blocks) transmitted during a given period, NB_RECEIVED is the number of corresponding data blocks received correctly, $N^{(c)}$ is the number of bits of a radio block for a given modulation scheme corresponding to a reference modulation, $N_i$ is the number of information bits in the radio block including the i-th data block received, and ni (respectively n'i) is equal to the number of data blocks in the radio block containing the i-th data block received (respectively transmitted).

Note that $n_i$ can be different from $n'_i$ if the modulation scheme changes during the period concerned for calculating $R_{net}/R_0$ and some data blocks are not received correctly.

An equivalent way of writing the above expression is as follows:

$$\frac{R_{net}}{R_0} = \frac{\sum_{i=0}^{NB\_RECEIVED-1} \frac{\rho_i}{n_i}}{\sum_{i=0}^{NB\_SENT-1} \frac{1}{n_i}},$$

with $\rho_i = N_i/N^{(c)}$.

For example:

for the GPRS system $\rho_i$ is from 0 to 1 and for the EGPRS system pi is from 0 to 3 (the value 3 corresponding to the fact that there are three information bits per symbol in 8PSK), for the GPRS system $n_i$ is always equal to 1 and for the EGPRS system $n_i$ is equal to 1 for the modulation and coding schemes MCS1 to MCS6 and $n_i$ is equal to 2 for the modulation and coding schemes MCS7 to MCS9.

Another expression for $R_{net}/R_0$ is as follows:

$$\frac{R_{net}}{R_0} = \frac{\sum_{i=0}^{NB\_RECEIVED-1} \frac{N_i}{n_i}}{\sum_{i=0}^{NB\_SENT-1} \frac{N_i^{(c)}}{n_i}},$$

in which NB_SENT is the number of data blocks transmitted during a given period, NB_RECEIVED is the number of corresponding data blocks received correctly, $N_i^{(c)}$ is the number of bits in the radio block including the i-th data block transmitted, $N_i$ is the number of information bits in the radio block including the i-th data block received, and ni (respectively n'i) is equal to the number of data blocks in the radio block containing the i-th data block received (respectively transmitted).

In systems like the GPRS and EGPRS systems, for example, the correct or incorrect status of the blocks received necessary for quality evaluation in accordance with one or other of the preceding expressions can be obtained in the following manner.

If quality is evaluated in the network:

in the downlink transmission direction (i.e. from the network to the mobile station), the network knows which block it transmits and also which blocks are received correctly or incorrectly, thanks to the Packet downlink ACK/NACK messages sent regularly by the mobile station to the network, and in the uplink transmission direction (i.e. from the mobile station to the network), the network can tell if blocks are received correctly or not using a CRC code, as outlined above. Also, the numbers of blocks sent are known to follow on in sequence, so that if the last two blocks received correctly are blocks 8 and 11, for example, the network can tell that blocks 9 and 10 have been sent but have not been received correctly.

If quality is evaluated in the mobile station, the principles can be the same as those indicated above, the Packet downlink ACKINACK messages then being replaced by the Packet uplink ACK/NACK messages sent regularly by the network to the mobile station.

Furthermore, if quality is evaluated in the network, it can be evaluated in one or the other of the entities constituting the network (also referred to herein as mobile radiocommunication network entities), such as:

base stations, which depending on the system may be referred to as base transceiver stations (BTS) or Node B, for example, base station controllers, which depending on the system may instead be referred to as radio network controllers (RNC), for example, and mobile switching centers (MSC), for example.

Quality can be evaluated in the base station controllers, for example. More particularly, in the case of the GPRS and EGPRS systems, quality can be evaluated in a functional entity known as the packet control unit (PCU) supporting packet mode data services. This entity is in charge of the RLC layer in particular, and therefore of functions such as block retransmission, etc.

In the example considered here of application to the GPRS and EGPRS systems, the quality indicator in accordance with the invention can be used for two purposes, for example:

releasing the TBF (i.e. stopping transmission) when $R_{net}/R_0$ is below a configurable threshold, and activating cell reselection when $R_{net}/R_0$ is below a configurable threshold higher than the TBF-release threshold; this is because, if radio conditions are very bad, it is preferable to search for a better cell first, before releasing the TBF.

However, the quality indicator in accordance with the invention could also be used for other purposes, such as link adaptation, for example.

Furthermore, the radio criterion according to the invention has mainly been described in the situation in which the retransmission technique is used. The radio criterion consisting of the BLER can be used in the contrary case. However, the radio criterion according to the invention could also be used in the latter case.

The invention claimed is:

1. A method of evaluating the quality of a radio link in a mobile radiocommunication system, said method comprises:
   determining a net bit rate transmitted on said link; and
   evaluating said quality in accordance with the determined net bit rate.

2. The method claimed in claim 1 wherein data transmitted on said link is obtained by coding blocks of information bits and said net bit rate is obtained by calculation using the equation:

$$R_{net} = \frac{1}{T} \sum_{i=0}^{NB\_RECEIVED-1} N_i$$

in which NB_RECEIVED is the number of blocks received correctly during a given period T and $N_i$ is the number of information bits in the i-th block received correctly.

3. The method claimed in claim 1 wherein said quality is evaluated on the basis of a relative net bit rate, which is defined as the ratio between said net bit rate and a gross bit rate.

4. The method claimed in claim 3 wherein said ratio between said net bit rate and said gross bit rate is obtained by calculation using the equation:

$$\frac{R_{net}}{R_0} = \frac{\sum_{i=0}^{NB\_RECEIVED-1} N_i}{\sum_{i=0}^{NB\_SENT-1} N_i^{(c)}}$$

in which NB_SENT is the number of blocks transmitted during a given period, NB_RECEIVED is the number of corresponding blocks received correctly, $N_i^{(c)}$ is the number of bits of the i-th block transmitted, and $N_i$ is the number of information bits in the i-th block received correctly.

5. The method claimed in claim 3 wherein the number of bits of the blocks transmitted is a function of the modulation scheme used and said gross bit rate is determined for a given modulation scheme corresponding to a reference modulation regardless of the modulation scheme used.

6. The method claimed in claim 5 wherein said ratio between said net bit rate and said gross bit rate is obtained by calculation using the equation:

$$\frac{R_{net}}{R_0} = \frac{\sum_{i=0}^{NB\_RECEIVED-1} N_i}{NB\_SENT * N^{(c)}}$$

in which NB_SENT is the number of blocks transmitted during a given period, NB_RECEIVED is the number of corresponding blocks received correctly, $N^{(c)}$ is the number of bits in a block transmitted with a given modulation scheme corresponding to a reference modulation, and $N_i$ is the number of information bits in the i-th block received correctly.

7. The method claimed in claim 5 wherein said reference modulation is a modulation of lower spectral efficiency.

8. The method claimed in claim 3 wherein the blocks transmitted, or radio blocks, can comprise one or more blocks, or data blocks, depending on the modulation scheme used, and the ratio between said net bit rate and said gross bit rate is obtained by calculation using the equation:

$$\frac{R_{net}}{R_0} = \frac{\sum_{i=0}^{NB\_RECEIVED-1} \frac{N_i}{n_i}}{\sum_{i=0}^{NB\_SENT-1} \frac{N_i^{(c)}}{n_i}},$$

in which NB_SENT is the number of data blocks transmitted during a given period, NB_RECEIVED is the number of corresponding data blocks received correctly, $N_i^{(c)}$ is the number of bits in the radio block including the i-th block of data transmitted, Nis the number of information bits in the radio block including the i-th block of data received, and ni (respectively n'i) is equal to the number of data blocks in the radio block containing the i-th block of data received (respectively transmitted).

9. The method claimed in claim 3 wherein said blocks transmitted, or radio blocks, can comprise one or more blocks, or data blocks, depending on the modulation scheme used, and the ratio between said net bit rate and said gross bit rate is obtained by calculation using the equation:

$$\frac{R_{net}}{R_0} = \frac{\sum_{i=0}^{NB\_RECEIVED-1} \frac{N_i}{n_i}}{\sum_{i=0}^{NB\_SENT-1} \frac{N^{(c)}}{n_i}},$$

in which NB_SENT is the number of data blocks transmitted during a given period, NB_RECEIVED is the number of corresponding data blocks received correctly, $N^{(c)}$ is the number of bits in a radio block for a given modulation scheme corresponding to a reference modulation, $N_i$ is the number of information bits in the radio block including the i-th data block received, and ni (respectively n'i) is equal to the number of data blocks in the radio block containing the i-th data block received (respectively transmitted).

10. The method claimed in claim 3 wherein the blocks transmitted, or radio blocks, can comprise one or more blocks, or data blocks, depending on the modulation scheme used, and the ratio between said net bit rate and said gross bit rate is obtained by calculation using the equation:

$$\frac{R_{net}}{R_0} = \frac{\sum_{i=0}^{NB\_RECEIVED-1} \frac{\rho_i}{n_i}}{\sum_{i=0}^{NB\_SENT-1} \frac{1}{n_i}},$$

in which NB_SENT is the number of data blocks transmitted during a given period, NB_RECEIVED is the number of corresponding data blocks received correctly, $N^{(c)}$ is the number of bits in a radio block for a given modulation scheme corresponding to a reference modulation, $N_i$ is the number of information bits in the radio block including the i-th data block received, ni (respectively n'i) is equal to the number of data blocks in the radio block containing the i-th data block received (respectively transmitted), and $\rho_i$ is equal to $N_i/N^{(c)}$.

11. A mobile radiocommunication network entity, said network entity comprising:

a radio receiver that receives a radio link; and a quality evaluator coupled to said radio receiver, wherein said quality evaluator determines a net bit rate transmitted on said link and evaluates the quality of said radio link from the determined net bit rate transmitted.

12. The entity claimed in claim 11 wherein said link is an uplink.

13. The entity claimed in claim 11 wherein said link is a downlink.

14. A mobile station, said station comprising:

a radio receiver that receives a radio link; and a quality evaluator coupled to said radio receiver, wherein said quality evaluator determines a net bit rate transmitted on said link and evaluates the quality of said radio link from the determined net bit rate.

15. The mobile station claimed in claim 14 wherein said link is a downlink.

16. The mobile station claimed in claim 14 wherein said link is an uplink.

* * * * *